United States Patent
Hahn et al.

(10) Patent No.: US 6,485,030 B1
(45) Date of Patent: Nov. 26, 2002

(54) SEALING ELEMENT FOR USE IN MOTOR VEHICLES

(75) Inventors: Roland Hahn, Germering (DE); Martin Schlenke, Braunschweig (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/698,139

(22) Filed: Oct. 30, 2000

(30) Foreign Application Priority Data

Oct. 29, 1999 (DE) .......................... 199 52 399

(51) Int. Cl.⁷ .................... B60J 10/10; F16J 15/00; B32B 9/04
(52) U.S. Cl. .................. 277/645; 277/644; 277/647; 277/650; 428/446; 428/447; 428/448
(58) Field of Search ................ 428/446, 447, 428/448, 449, 450, 451; 277/644, 645, 646, 647, 650

(56) References Cited

U.S. PATENT DOCUMENTS

| 3,641,707 A | 2/1972 | Kellos |
| 5,961,128 A * | 10/1999 | Klammer .................. 277/646 |
| 6,075,205 A * | 6/2000 | Zhang .................. 174/35 GC |
| 6,287,669 B1 * | 9/2001 | George et al. .............. 428/156 |

FOREIGN PATENT DOCUMENTS

| DE | 28 38 447 B1 | 8/1979 |
| DE | 33 05 257 A1 | 8/1984 |
| DE | 94 17 149 U | 12/1994 |
| DE | 94 17 149.1 | 2/1995 |
| DE | 197 20 713 | 5/1998 |
| EP | 0 357 973 | 3/1990 |

* cited by examiner

Primary Examiner—Robert Dawson
Assistant Examiner—Michael J Feely
(74) Attorney, Agent, or Firm—Nixon Peabody LLP; David S. Safran

(57) ABSTRACT

A sealing element for use in motor vehicles which has a sealing body (12) made of silicone and is provided with a self-sticking adhesive surface (20) for attachment to the application site.

9 Claims, 1 Drawing Sheet

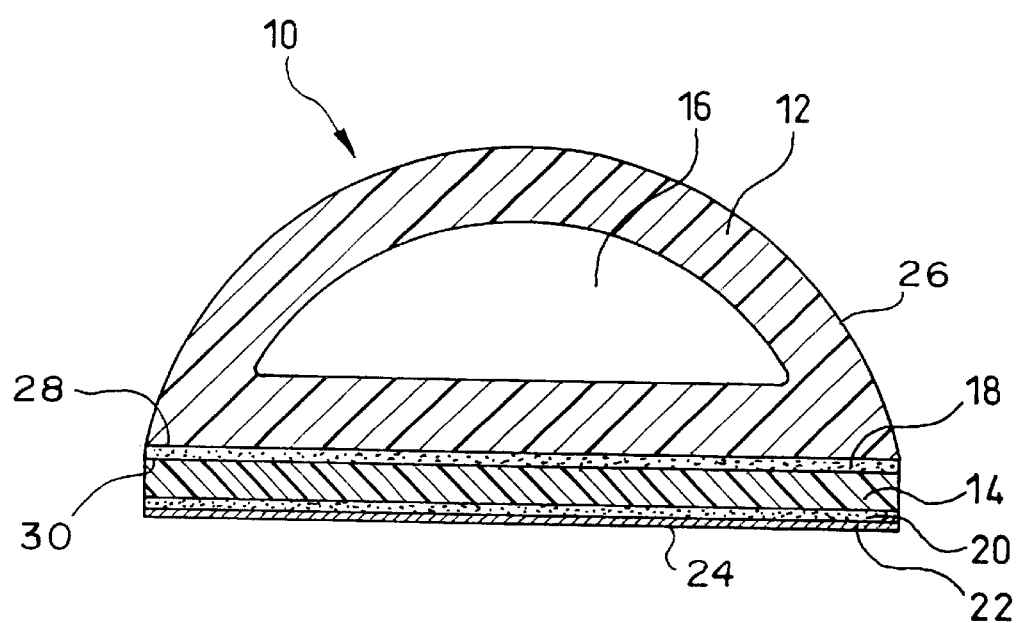

SEALING ELEMENT FOR USE IN MOTOR VEHICLES

BACKGROUND OF THE INVENTION

1. Field of the Invention

This invention relates to a sealing element having a sealing body of silicone for use in motor vehicles, especially for openable motor vehicle roofs.

2. Description of Related Art

In the field of motor vehicles, silicone seals are known which are provided with a plug-in foot by means of which they can be inserted at the application site. This type of attachment however entails a large amount of space and is a disadvantage in this respect.

German Utility Model DE G 94 17 149 discloses a sealing element with a sealing body of elastic material which has an adhesive surface by means of which it is attached to the bottom of the cover of a sliding roof, a lifting roof or on its frame. The adhesive surface is formed on an adhesive tape which is attached with its back to a base body which is connected to the sealing body and is made of a stiffer material than the sealing body. Before attaching the seal, the adhesive surface is protected with a removable protective film.

Similar sealing elements are furthermore known from German Patent DE 197 20 713 C1 and published European Patent Application EP 0 357 973 B1. German Patent DE 197 20 713 C1 names EPDM as the preferred material for the sealing body. However, this material is not optimum with respect to temperature resistance, restoration behavior, seal properties and is susceptible to the danger of freezing and sticking together.

SUMMARY OF THE INVENTION

The primary object of this invention is to devise a sealing element for use in motor vehicles which can be attached easily, quickly, and economically in terms of installation space and still has good properties with respect to temperature resistance, restoration behavior, seal properties and the danger of freezing and sticking together, etc.

This object is achieved in accordance with the invention in that the sealing element is provided with a self-sticking adhesive surface for attachment to the application site.

In the approach according to the invention, it is advantageous that the sealing body of silicone has outstanding properties in terms of temperature resistance, restoration behavior, seal properties and danger of freezing and sticking together and still the sealing element can be easily attached quickly and with little space requirement at the application site while, for example, when the sealing body is cemented directly to the application site by means of silicone cement, as a consequence of the resulting long setting time, it could not be used in series production. The invention overcomes a prejudgment of the technical world according to which the advantages of a silicone seal cannot be combined with simple installation using a self-sticking adhesive surface provided on the seal.

In one preferred embodiment of the invention, the adhesive surface is formed, for example, by an acrylate adhesive and is protected by a removable protective film before attachment of the seal. Furthermore, the adhesive surface is preferably made planar and is provided on a carrier element which, for its part, is cemented to the sealing body, and this cementing can be formed by a silicone cement. The carrier element is preferably formed by a flexible strip, and the adhesive surface can extend essentially over the entire length of the sealing body. The sealing body is preferably an elongated extrusion section which can surround a cavity.

One embodiment of the invention is explained below, by way of example, using the attached drawing which shows a cross section through a sealing element in accordance with the invention.

BRIEF DESCRIPTION OF THE DRAWINGS

The sole FIGURE is a cross-sectional view of a sealing element in accordance with a preferred embodiment of the invention.

DETAILED DESCRIPTION OF THE INVENTION

The FIGURE shows a sealing element 10 which comprises a sealing body 12, which is formed by and elongated extruded section of silicone, and a flexible carrier strip 14. The sealing body 12 surrounds a cavity 16, wherein the base exterior wall 24 of the sealing body 12 is made planar over the entire length and width. The sealing body 12 also comprises an exterior sealing wall 26, which arcs continuously form one longitudinal side of the base exterior wall to an opposite longitudinal side of the base exterior wall. The carrier strip 14 comprises a first surface 28, which is cemented by means of a layer 18 of silicone cement over the entire length and width of the base exterior wall 24. The carrier strip 14 also comprises as second surface 30, which is provided with a self-sticking adhesive surface 20, which is used to attach the sealing body 12 to the application site by a protective film 22, which is removed during installation. The material of the adhesive surface 20 is chosen depending on the adhesive base at the application site, wherein an acrylate adhesive is preferably used. The adhesive surface 20 extends preferably over the entire length and width of the base exterior wall 24 of the sealing body 12 and is made essentially planar.

The described sealing element 10 is preferably used for sealing an openable motor vehicle roof, for example, a sliding roof, a lifting roof, a sliding and lifting roof or a spoiler roof, and it can be attached, for example, to the bottom of the cover or on its frame.

This invention devises a sealing element which has good properties with respect to temperature resistance, restoration behavior, seal properties and the danger of freezing, etc. and still can be attached easily and quickly to the application site, without using either plug-in connections which require a relatively large amount of installation space and installation cost, or silicone cement which entails a long setting time.

What is claimed is:

1. Sealing element for use in motor vehicles which comprises a sealing body made of silicone, in which the sealing body has a hollow cross-sectional profile with a flat base exterior wall that is provided with a self-sticking adhesive surface for attachment to an application site, and said sealing body has an exterior sealing wall which arcs continuously from one longitudinal side edge of the base exterior wall to an opposite longitudinal side edge of the base exterior wall; wherein said sealing element is particularly adapted for sealing between a movable cover and a roof frame of an openable motor vehicle roof seal.

2. Sealing element as claimed in claim 1, wherein the adhesive surface is formed of an acrylate adhesive.

3. Sealing element as claimed in claim 1, wherein the adhesive surface is protected by a removable protective film which is removable for attachment of the sealing element.

4. Sealing element as claimed in claim 1, further comprising a carrier element comprising a first surface joined to the base exterior wall of the sealing body by a cement and a second surface provided with said adhesive surface.

5. Sealing element as claimed in claim 4, wherein said cement is silicone cement.

6. Sealing element as claimed in claim 4, wherein the carrier element is a flexible strip.

7. Sealing element as claimed in claim 1, wherein the adhesive surface extends essentially over the entire length and width of the base exterior wall of the sealing body.

8. Sealing element as claimed in claim 1, wherein the adhesive surface is essentially planar.

9. Sealing element as claimed in claim 1, wherein the sealing body is an elongated extruded section.

* * * * *